United States Patent
Kernahan et al.

(10) Patent No.: US 7,574,321 B2
(45) Date of Patent: Aug. 11, 2009

(54) MODEL PREDICTIVE THERMAL MANAGEMENT

(75) Inventors: Kent Kernahan, Cupertino, CA (US); Craig Norman Lambert, San Jose, CA (US); Sorin Andrei Spanoche, Santa Clara, CA (US)

(73) Assignee: Exar Corporation, Fremont, CA (US)

( * ) Notice: Subject to any disclaimer, the term of this patent is extended or adjusted under 35 U.S.C. 154(b) by 26 days.

(21) Appl. No.: 11/548,283

(22) Filed: Oct. 11, 2006

(65) Prior Publication Data

US 2007/0168151 A1 Jul. 19, 2007

Related U.S. Application Data

(60) Provisional application No. 60/725,983, filed on Oct. 11, 2005.

(51) Int. Cl.
*G06F 19/00* (2006.01)
*G01K 17/00* (2006.01)

(52) U.S. Cl. .................. 702/179; 702/136; 702/187; 702/188; 713/300

(58) Field of Classification Search .......... 702/60, 702/127, 132, 179; 713/300, 320–324, 340, 713/313; 361/24, 25, 103
See application file for complete search history.

(56) References Cited

U.S. PATENT DOCUMENTS

| | | | |
|---|---|---|---|
| 2004/0054937 A1* | 3/2004 | Williams et al. | 713/300 |
| 2004/0095119 A1* | 5/2004 | Kernahan et al. | 323/282 |
| 2004/0128101 A1* | 7/2004 | Hermerding, II | 702/136 |

* cited by examiner

*Primary Examiner*—Eliseo Ramos Feliciano
*Assistant Examiner*—Phuong Huynh
(74) *Attorney, Agent, or Firm*—Michael W. Caldwell

(57) ABSTRACT

Electrical components which substantially dissipate the power provided them in the form of heat will change temperature in response to self heating, heat transfer to their surroundings, and heat transferred from one component to another. A method is disclosed for calculating the temperature of a component(s) using a thermal model. In one embodiment the power dissipation of each component is controlled to limit the temperature of the component. In one embodiment the temperature of a component is modified by changing the power dissipation of another component. In some embodiments the power dissipation of a component is modified by modifying its performance. In another embodiment power dissipation is modified by selecting one or more programs for modified execution.

23 Claims, 9 Drawing Sheets

MODEL PREDICTIVE THERMAL MANAGEMENT

CROSS REFERENCE TO RELATED APPLICATIONS

The present application claims priority of U.S. provisional application No. 60/725,983 filed on Oct. 11, 2005, incorporated herein by reference.

This application is related to U.S. patent application Ser. No. 10/295,514 filed on Nov. 14, 2002, by Kent Kernahan, entitled "Switching Power Converter", now U.S. Pat. No. 6,891,355 issued May 5, 2005 entitled "Method For Computing An Amount Of Energy Taken From A Battery" which is incorporated by reference herein in its entirety.

BACKGROUND

It is desirable to know the temperature of all the elements of an electronic system as well as to know the rates of change of temperature and the ultimate temperature that the elements would achieve if present power conditions continued. For example, consider a circuit board that includes a CPU, RAM and a hard disk drive. Each of these elements generates heat while in operation and that heat affects each of them individually. Heat radiated or conducted from each can affect the other components. It would be desirable to determine electronically the amount of heat generated by each of the components to permit proactive action if undesirable conditions appear to be likely to occur.

SUMMARY

In accordance with the present invention the power being delivered to power consuming elements is determined. By the second law of thermodynamics, the power delivered to those elements will be ultimately dissipated as heat. The present invention provides a system to control heat dissipation in the elements.

DETAILED DESCRIPTION

Figure 1:
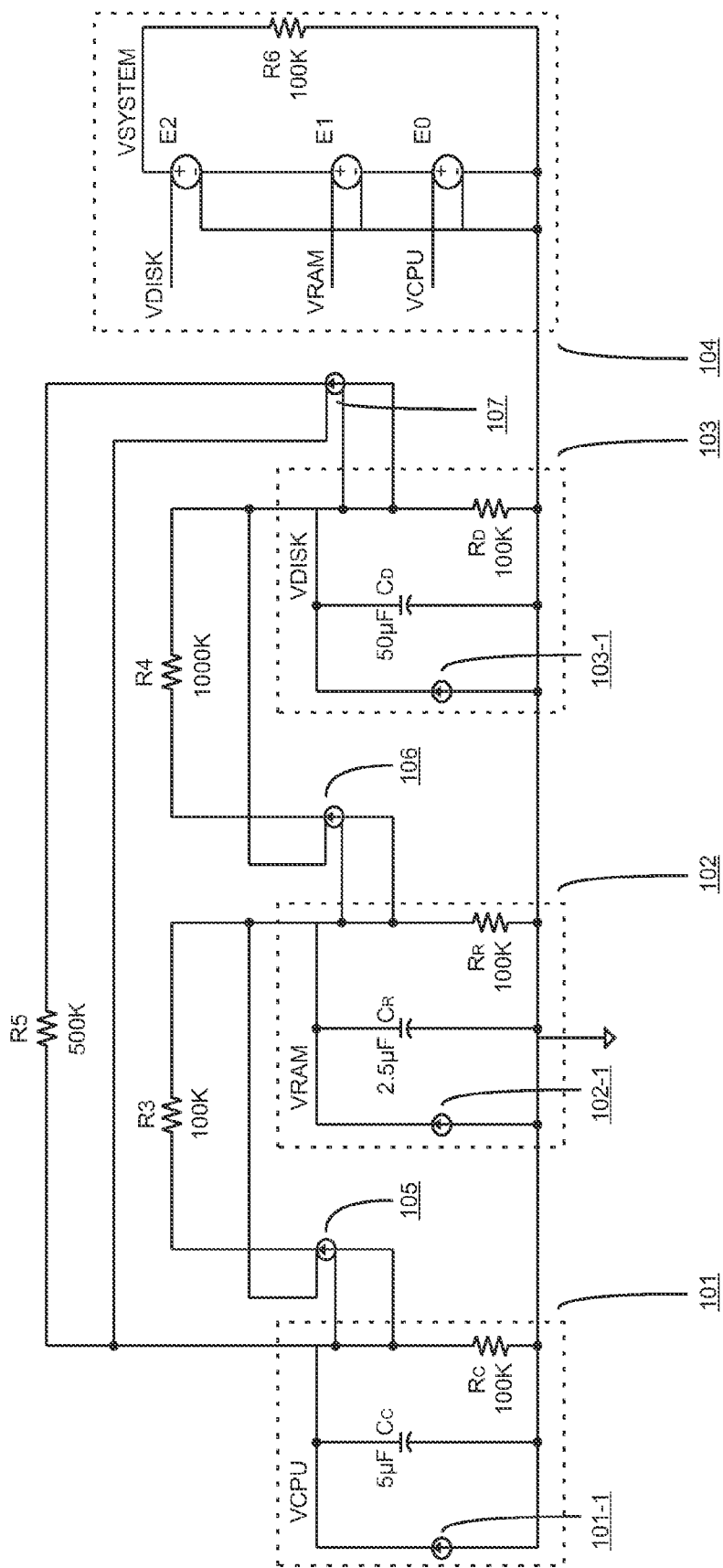
FIG. 1 is an electrical representation of a thermodynamic system including a CPU, RAM, and a disk drive.

Most of the power that is delivered to any system in a computer will ultimately be dissipated as heat. A relatively small fraction of the input power is transformed into signals and noise conducted or radiated away from the system by displays, cables, radio-frequency transmitters, and so on. Looking at the inter-relationship between the various elements in a computer or other electronic system from a thermal perspective, each one of those elements, such as CPU, RAM, and disk drive, will have associated with it a certain thermal mass which is comprised of the electronic device itself and a portion of the circuit board and associated components to which it is directly attached. Each element also has a thermal resistance associated with heat flow to each of the other elements and to the enclosure for the electronic system. By accounting for power dissipated by individual elements and paths coupling heat between elements, a set of simultaneous equations can be prepared to predict the temperature of each element in an electronic system. The temperature of any individual element is described in an equation by terms for the power dissipated by the element, resistance to heat flow between the element and other elements, and resistance to heat flow between the element and its environment. For example, one form of an equation for calculating the temperature of a CPU in a computer system comprising a CPU, RAM, and a disk drive is $APC+BPR+CPD=TC$, where A, B, and C are constants, PC, PR, and PD represent power dissipated by the CPU, RAM, and disk drive respectively, and TC is the temperature of the CPU. By writing one equation for each element where the constants (A,B, and C above) represent thermal resistance and then converting the system of simultaneous equations to matrix form, it can be seen that the resulting coefficient matrix will be square for any number of elements present in the electronic system. If another element is added, such as a graphics controller, there will still be as many equations as unknown temperatures to be solved for, and the matrix will be deterministic. In one embodiment cooling means, for example a fan, a thermal pipe, a Peltier junction device, and the like, wherein the cooling means is associated with a given element, is provided. The designer determines the thermal resistance of the element as a function of the utilization of the cooling means. The value for the thermal resistance of an element as used in calculations is modified in accordance with the use of the cooling means and the predetermined thermal resistance parameter. For the purposes of this explanation, thermal resistance means the resistance to heat flow from one element to another.

By adding more detail to the thermal model, for example the thermal mass of each of the elements, it is possible to estimate not only the ultimate or steady-state temperature but also the temperature response to changes in power consumption as a function of time. Thermal mass is the product of the specific heat of a material and the mass of that material. Thermal mass is also referred to as caloric capacity or heat capacity. A numerical value for the thermal mass of an element may be provided by the manufacturer of the element or by experimental observation by the system designer. With a single power conversion circuit that is capable of driving multiple power rails simultaneously and measuring the power flow in each of the power rails, using a single ambient temperature sensor which senses the outside case temperature of the product containing the CPU, RAM and disk drive, it is possible to determine the temperature of those elements, the rates of change of the temperature of those elements and the ultimate temperatures that they will reach. Providing this information to an operating system permits very fine grain thermal management. For example, if multiple software applications attempt to execute simultaneously, swapping of data back and forth between the disk drive and RAM may lead to very high power dissipation by the disk drive. If power dissipation limits established for the disk drive are exceeded, or are predicted to do so, the operating system could control the applications' access to the disk drive to reduce drive activity and reduce temperatures inside the computer without necessarily reducing computer performance. Similarly, if it was found that the CPU was overheating, there may be cooling strategies that could be applied to it, or its usage could be reduced. There are also strategies that could be applied if the RAM were determined to be the element that was approaching its maximum permitted temperature. By providing estimates of current and predicted temperatures of each element to the operating system, proactive measures may be taken to avoid high thermal conditions. For example, it is well-known that semiconductor-based devices, especially digital semiconductor-based devices, require higher operating voltages to operate at the same speed at higher temperatures. Accordingly, by having real-time information about current and predicted temperatures, the voltage rails can be managed by the power conversion circuit to produce the lowest possible voltage consistent with the performance that is required.

In one embodiment, a power conversion and management integrated circuit is provided which converts electrical power, for example from one or more batteries, to multiple output supply rails which supply different voltages and different powers. The power conversion and management integrated circuit also measures power drawn from the batteries and power supplied to other elements, estimates remaining battery life, and controls the shut down of loads at various thresholds of remaining power. In addition, the power information can be used in combination with a matrix model of the product that contains this power conversion and management integrated circuit to measure and report and manage the thermal characteristics of all elements. For example, by knowing the thermal limit and thermal mass of each element in the system, it is possible to determine how fast an element will exceed a temperature limit and either reduce power to the element if that is appropriate for the application, or reduce the power supplied to other elements to keep them from contributing to the heat inside the package and thereby let the element run faster and longer.

The CPU can be used to make determinations about how system operations should be adjusted according to thermal predictions. The control of a disk drive is one example. Modern operating systems utilize several layers of cache memory inside the CPU and other memory outside of the CPU to minimize disk drive activity and perform other functions. More particularly, if there are multiple software applications running simultaneously, they compete for system resources, and the operating system pages those applications back and forth to the hard disk drive. Many resource demands occurring simultaneously can result in a dramatic increase in disk drive activity. If the operating system receives information from the thermal management system that continued operation of the disk drive at the present pace for some time period of interest would violate the temperature limit for the disk drive, then the operating system could change the priority of pending tasks so the disk is accessed less frequently. For example, low priority tasks could be serviced less often. Alternatively, the operating system could suspend certain applications until the temperature is reduced or high-priority activity subsides. This allows the operating system to manage the reduction of thermal loads in a planned, stepwise fashion until the only remaining activities are basic OS routines. If the computer is operating in a hot environment and it is determined that thermal limits would be exceeded, then the control system can reduce CPU activity to slow down the overall performance of the machine. From the user's point of view, this provides a graceful reduction in performance as the CPU temperature approaches the thermal limits.

Traditional design methods use temperature measurements made during combinatorial testing of hardware elements, software applications, and ambient temperatures to estimate the worst-case thermal conditions that a system must be designed to survive. One skilled in the art will recognize the difficulty in testing a suitable number of permutations to predict the true worst-case condition with confidence, so an additional temperature margin is often provided for in the system specification. Compared to traditional methods, the current embodiment permits design to a narrower range of thermal constraints, resulting in smaller products and offering the possibility of user-selected temperature limits. For example, industry standards permit surface temperatures of 60° C. in some products, but some users may prefer to instruct the product to reduce its surface temperature by selectively reducing performance of some of the elements in the system. Thus the user would be able to select a thermal limit different from that selected by the system designer.

At the product design time the thermal mass of all the various elements and the thermal resistance between the elements to the outside are known. Those data are physical results of the mechanical design of the product. However what is not known is the power that will be consumed in the various operating environments. For example, if the overall product temperature is very cold, semiconductor devices can be made to draw less power in a cold environment, and can be operated at lower voltages. Similarly the power dissipated by a RAM device at a cold temperature could be lower than the power dissipated when operating hot, which requires a higher voltage to function properly, and to operate at the same performance level which dissipates more power. Since computer manufacturers purchase components from different manufacturers and some RAMs are more efficient, power usage measurement is important. Access times and net bandwidths at lower power are achievable. Accordingly, by measuring the power that's taken out of the equation, when the manufacturer installs more efficient RAM, it would be measured to consume less power and therefore will be able to operate at higher activity levels before generating high thermal effects and the thermal management system according to the present invention can be used to dynamically adapt the system.

In accordance with the present invention, in one embodiment thermal management is performed by a power converter circuit. This can be accomplished using portions of the system disclosed in commonly assigned U.S. Pat. No. 6,891,355 issued to Kent Kernahan on May 10, 2005 which is incorporated herein by reference in its entirety. The present invention employs the use of features of three major blocks of the system disclosed in the above-referenced '355 patent. One block is the data acquisition system which measures the output voltages and the rates of change of output voltages and then provides that information to the regulation engine. The regulation engine uses calculus in real time with regard to the voltage and time information and the model it has of the actual components to control the output voltage, to estimate the amount of charge transferred to the output circuit and with that information regulates voltages, currents, ramps, and handle overload conditions.

The third block in the '355 patent which is used in the present invention is the system block. The system block contains an 8051-type microcontroller, RAM, and ROM, run the program and perform overall management, such as power management and turning other elements on and off in response to received commands or in response to measurements of external conditions. Examples include insufficient battery life to run a particular output, voltages which are too low to run particular channels, various failure conditions, over-current limits, or error conditions such as watch dog timeouts which may cause the system block to turn other elements off. In addition, the system block also takes the raw information from the regulation engine and converts that to perform tasks. An exemplary task is a battery charging algorithm wherein constant current is regulated for a time, and then constant voltage or the latest battery charging algorithm where the rate of voltage change is used to determine the rate of charge to provide a constant rate of charging. Using information and features of the '355 patent, along with the matrix of the thermal characteristics of the product, such as estimated or measured instant temperatures, rates of temperature change and predictions of ultimate or steady-state temperatures are determinable. The system block interacts with the operating system in upper layers, and reports this information to achieve management of the thermal parameters of these elements. For example, in one embodiment, the thermal management system reports temperature information to the operating system and if a temperature is projected to exceed a limit within or for a pre-programmed period of time, then the thermal management system is programmed to shed that load autonomously in order to protect the product. In one embodiment, the power/thermal management circuit asserts a wait command on a disk drive control line to make the drive appear to be busy whenever the drive is projected to exceed its operating temperature limit, thereby reducing system performance. Alternatively, the CPU may be instructed to do nothing for one or more cycles. In one embodiment the power/thermal management circuit provides information to an outside host. The host commands action to take to the power/thermal management circuit.

System Specifics

Although the present invention is applicable to systems other than computer systems, for the purposes of explanation of the present invention a system is described which includes a CPU, RAM and a disk drive (DISK) as being the primary heat producers. Such a system is illustrated from an electrical standpoint in FIG. 1. Looking at FIG. 1, the CPU representation in electrical form is indicated in the dashed block designated by reference character 101. Similarly, the RAM portion of the system is indicated by the dashed line block labeled 102 and the DISK portion is illustrated within the dashed line block labeled 103. The combined system of the CPU, RAM and DISK is represented electrically in the block indicated by reference character 104.

Thermodynamic systems can be modeled as electrical networks by establishing equivalents among the elements. In Control-Theoretic Techniques and Thermal-RC Modeling for Accurate and Localized Dynamic Thermal Management, Skadron, et al, tabulate the commonly-used equivalents between thermal and electrical quantities, as shown in Table 1.

TABLE 1

| Thermal Quantity | Unit | Electrical Quantity | Unit |
| --- | --- | --- | --- |
| P, Heat flow, power | W | I, Current flow | A |
| T, Temperature difference | °K | V, Voltage | V |
| $R_{th}$, Thermal resistance or $\theta$ | °K/W | R, Electrical resistance | $\Omega$ |
| $C_{th}$, or C for Thermal mass, capacitance | J/°K | C, Electrical capacitance | F |
| $\tau_{th} = R_{th} \cdot C_{th}$, Thermal RC constant | s | $\tau = R \cdot C$ | s |

With the thermal-electrical relationships shown in Table 1, an electrical circuit can be constructed that models the behavior of a thermodynamic system. Such a circuit is shown in FIG. 1, representing some of the major subsystems in a laptop or palmtop computer. The independent current sources $I_{CPU}$ indicated by reference character 101-1, $I_{RAM}$ indicated by reference character 102-1, and $I_{DISK}$ indicated by reference character 103-1 represent the thermal power generated in each of the blocks CPU, RAM, and disk drive, respectively. The capacitors, $C_{CPU}$, $C_{RAM}$ and $C_{DISK}$ are analogs of the thermal mass of the blocks. In the example of FIG. 1, the CPU has twice the thermal mass of the RAM and one-tenth the thermal mass of the disk drive. The disk drive, consequently, will heat and cool more slowly than the other blocks. Resistors $R_C$, $R_R$, and $R_D$ are thermal paths to the surrounding environment.

In addition to the self-heating by current terms $I_C$, $I_R$, and $I_D$, and cooling or heating through the resistances to the environment, each block transfers heat energy to the surrounding cooler blocks and absorbs heat from hotter blocks. Heat transfer among blocks is represented by (i) voltage-controlled current sources indicated by reference character 105, 106 and 107, whose output current is a function of the voltage difference at its control inputs (the voltage difference between two blocks), and (ii) by resistors R3, R4 and R5 to convey current between those blocks. This is the equivalent of heat flow whose magnitude and direction depend upon the temperature differences between the blocks. The voltage-controlled current sources 105, 106 and 107 are used to isolate the self-heating terms from the terms involving heat transfer to other blocks. That is, power dissipated in a block heats that block directly and surrounding blocks indirectly. The resistors represent thermal resistance between blocks.

Circuit 104 includes three voltage-controlled current sources connected in series, electrically summing the voltages across the blocks. Since voltage in the circuit corresponds to temperature in the system being modeled, voltages VCPU, VRAM, and VDISK represent the temperatures of the CPU, RAM, and disk drive, and VSYSTEM is the temperature of the complete system.

Referring to FIGS. 2A-2D, voltages VCPU, VRAM, and VDISK are displayed as power is applied first separately and then in combination to the three blocks. In this example, a voltage of one volt corresponds to the maximum allowable temperature for the system.

Figure 2A:
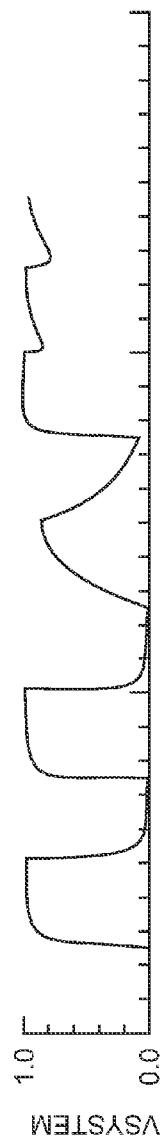
FIGS. 2A-2-D illustrate temperatures, represented as voltages, as a function of the power provided to the blocks illustrated in FIG. 1.
Figure 2B:
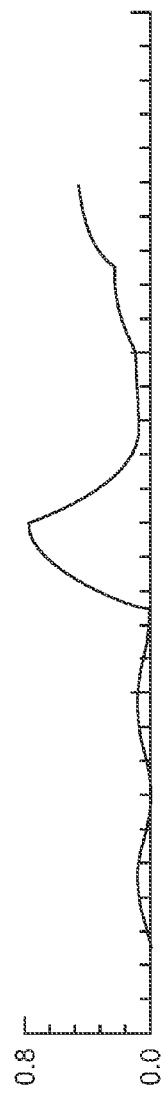
Figure 2C:
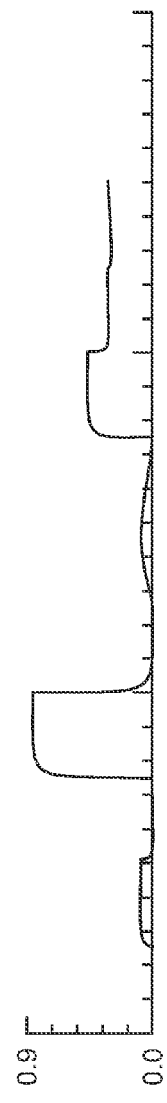
Figure 2D:
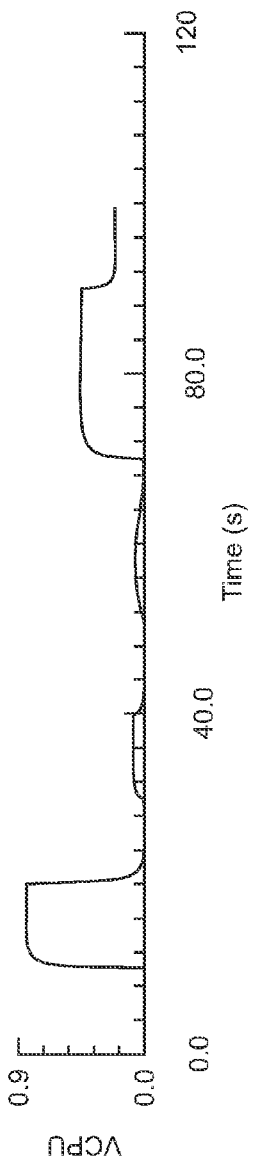

Beginning at time zero in FIG. 2A, the CPU is the only block powered up. Its relatively small thermal mass results in a relatively quick temperature rise when powered, and a similarly sprightly cooling when powered down. Although the other blocks are not powered, they absorb some heat from the CPU. This is shown by nonzero voltages present on their respective graphs in FIGS. 2B and 2C when only the CPU is operating.

Similarly, when the other blocks are powered independently, their temperature rises quickly and inactive blocks absorb heat and show a small temperature rise. For example, when only the RAM is powered at about time=30 seconds in FIG. 2B, its temperature rises quickly and transfers heat to the other blocks. The disk drive has a much larger thermal mass, so it is seen to heat more slowly than the other blocks.

FIGS. 2A, 2B, 2C and 2D illustrate how, by controlling the operation of heat generating components, the system is maintained operational and within acceptable thermal limits. For example, at about the 70 second time point, the RAM and CPU are powered on together, sharing the heat budget by running at less power than either did when powered independently. When power is applied to the disk drive at the 80 second time point, power to the RAM is reduced to accommodate the heat that the disk drive will generate. If the voltage on the RAM's power rail can be reduced gradually, optimum system performance could be achieved by reducing that voltage at a rate that equals the rate at which the temperature of the disk drive is increasing, assuming that the algorithm that controls the power delivered to each block is supplied with all of the pertinent coefficients. At 90 seconds, the disk drive begins consuming more power (spinning at a faster rpm, reading or writing more data per second, etc.) so the CPU's power is reduced. As before, this reduction could be done gradually to maintain the highest level of performance.

Using the electrical analogy of thermal behavior, it is possible to determine the rate of change of temperature of each of the heat-generating elements. The exemplary equations to follow describe the system as illustrated in FIG. 1 which includes a CPU, RAM and DISK as elements generating heat. More particularly, to determine the rate of change of temperature of the CPU as function of time the following formula is applicable:

$$\frac{dV_{CPU}}{dt} = \frac{I_C}{C_C} - \frac{V_{CPU}}{R_C * C_C} + \frac{V_{RAM} - V_{CPU}}{R3 * C_C} + \frac{V_{DISK} - V_{RAM}}{R4 * C_C} \quad (1)$$

Similarly, the rate of change of temperature of the RAM may be expressed by:

$$\frac{dV_{RAM}}{dt} = \frac{I_R}{C_R} - \frac{V_{RAM}}{R_R * C_R} + \frac{V_{CPU} - V_{RAM}}{R3 * C_R} + \frac{V_{DISK} - V_{RAM}}{R4 * C_R} \quad (2)$$

In similar fashion the rate change of temperature of the disk with respect to time taken in conjunction with the other elements of the system may be expressed as the following:

$$\frac{dV_{DISK}}{dt} = \frac{I_D}{C_D} - \frac{V_{DISK}}{R_D * C_D} + \frac{V_{CPU} - V_{DISK}}{R3 * C_D} + \frac{V_{RAM} - V_{DISK}}{R4 * C_D} \quad (3)$$

In each of the above equations, the first term represents the self-heating of the element and the second term represents the reduction of heat which is a function of the heat loss to the ambient air and to the circuit board or chasis. The third term and subsequent terms represent the addition of heat from other elements. It will be appreciated that an additional equation will be required to define the rate of change of temperature for any new heat source added to the system, and a new term added to each equation to represent the heat contribution from the new source to each of the other elements.

As will be appreciated from the above formulas, the rate of change of temperature for the entire system is the sum of each of the results of the calculations for the individual equations:

$$\frac{dV_{SYS}}{dt} = \frac{dV_{CPU}}{dt} + \frac{dV_{RAM}}{dt} + \frac{dV_{DISK}}{dt} \quad (4)$$

In order to achieve thermal equilibrium, each component must transfer heat to the environment. That relationship for each of the three elements of the system in FIG. 1 is indicated by equations 5, 6 and 7 below:

$$I_C - \frac{V_{RAM} - V_{CPU}}{R3} - \frac{V_{DISK} - V_{CPU}}{R5} = \frac{V_{CPU}}{R_C} \quad (5)$$

$$I_R - \frac{V_{CPU} - V_{RAM}}{R3} - \frac{V_{DISK} - V_{RAM}}{R4} = \frac{V_{RAM}}{R_R} \quad (6)$$

$$I_D - \frac{V_{CPU} - V_{DISK}}{R5} - \frac{V_{RAM} - V_{DISK}}{R4} = \frac{V_{DISK}}{R_D} \quad (7)$$

In the foregoing description, the system includes a CPU, RAM and a DISK, however the current embodiment is applicable to systems comprising multiple heat sources with sufficient thermal coupling between heat sources for one source to affect the temperature of another source.

Figure 3:
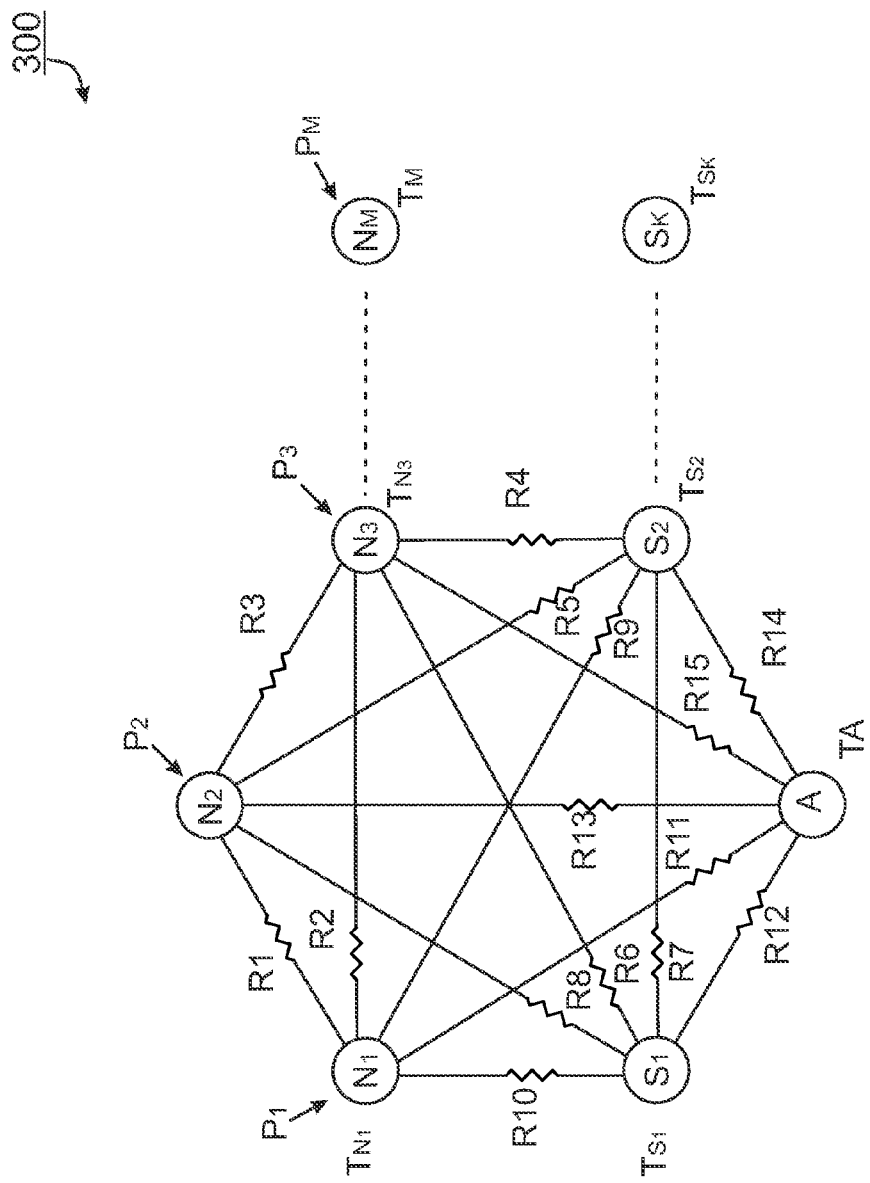
FIG. 3 is a thermal circuit representing a general thermodynamic system suitable for the final temperature analysis.

FIG. 3 is a schematic of an exemplary general system 300 which includes 'm' heat dissipation sources indicated by $N_1$, $N_2$, $N_3$ ... $N_m$ and 'k' temperature sensors indicated by reference characters $S_1$, $S_2$ ... $S_K$. Thermal resistances between the elements of the system are indicated by resistor symbols R1 to R15. As shown in FIG. 3, there is a thermal resistance between the members of every pair of thermally-coupled $N_i$ power consuming sources, a thermal resistance between each of the $N_i$ power sources and each of the temperature sensors $S_1, S_2, \ldots S_K$, and a thermal resistance from each source Ni to the ambient air node A, whose temperature is identified in the figure by TA. A thermal resistance also exists between the members of each pair of temperature sensors $S_1, S_2 \ldots S_K$ and between each of the temperature sensors and the ambient node A adjacent to reference character TA. The power being provided into heat dissipation sources $N_1$, $N_2$ and $N_3$ is indicated by $P_1$, $P_2$ and $P_3$ respectively, with the arrows indicating power input.

Equation 8 below is a general purpose equation which illustrates a static case in which the final temperature is determined. Equation 8 represents the principle of energy conservation for node $N_i$. $P_i$ is the power dissipated in $N_i$, the second group of terms represents the contribution due to the $N_i$-$N_j$ thermal coupling, the third group of terms stands for the $N_i$ to all sensors $S_j$ coupling and the last term is the direct interaction with TA.

$$i = \overline{1, m}: P_i + \sum_{\substack{j=1 \\ j \neq i}}^{m} \theta_{NiNj}^{-1}(T_{Nj} - T_{Ni}) + \quad (8)$$

$$\sum_{j=1}^{k} \theta_{NiSj}^{-1}(T_{Sj} - T_{Ni}) + \theta_{NiA}^{-1}(T_A - T_{Ni}) = 0$$

The notation used in equation 8 and subsequent equations is as follows. A subscript $N_x$ refers to power dissipating source number x, a subscript $S_x$ refers to temperature sensor number x, and subscript A refers to ambient air. $T_x$ is the temperature of element number x, and a thermal resistance between elements A and B is indicated by θAB.

Equation 9 is used to illustrate the same principle for the temperature sensor $S_i$ where the first set of terms consists in the $N_j$ to $S_i$ interaction while the last set of terms is for the sensor to sensor interactions.

$$i = \overline{1,k} \sum_{j=1}^{m} \theta_{NjSi}^{-1}(T_{Nj} - T_{Si}) + \sum_{\substack{j=1 \\ j \neq i}}^{k} \theta_{SiSj}^{-1}(T_{Sj} - T_{Si}) + \theta_{SiA}^{-1}(T_A - T_{Si}) = 0 \qquad (9)$$

Figure 4:
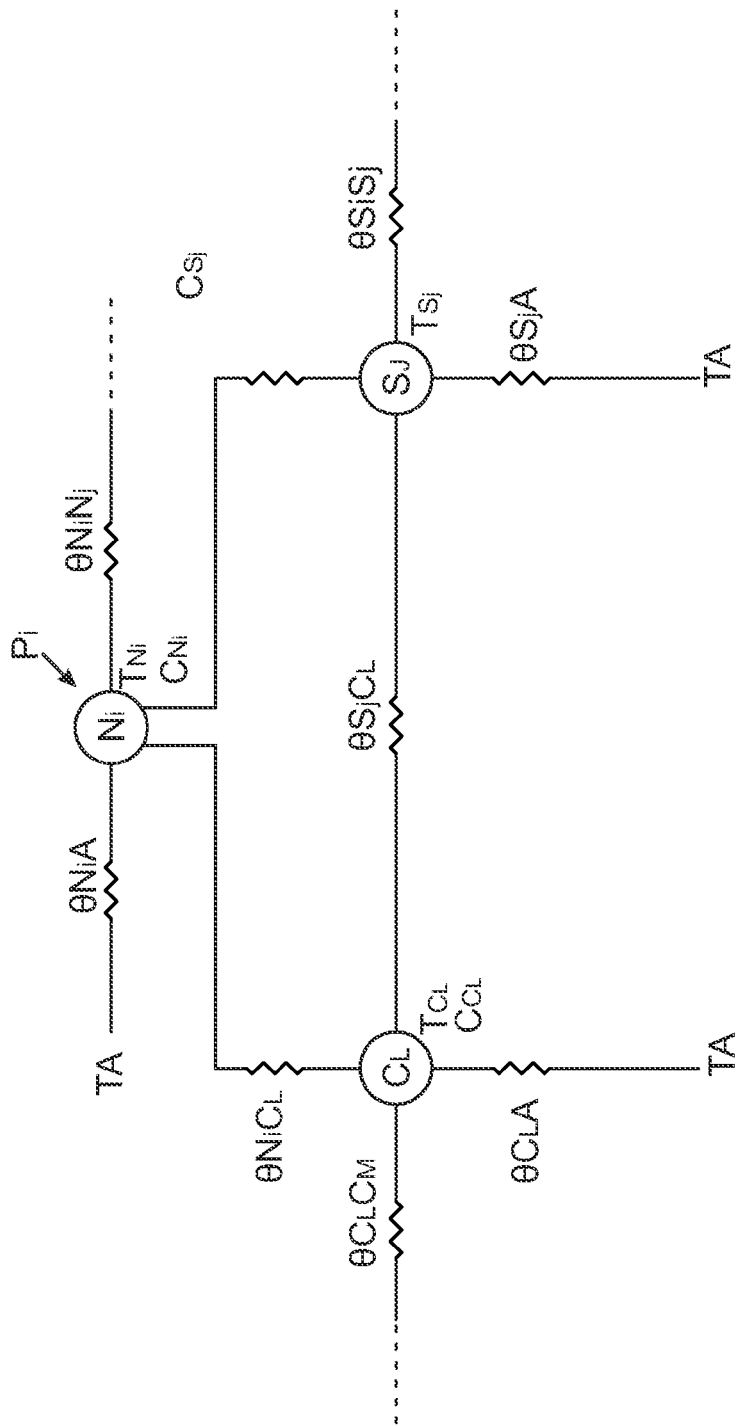
FIG. 4 is a thermal circuit representing a general thermodynamic system suitable for the thermodynamic temperature analysis.

FIG. 4 illustrates a thermal circuit representing a general thermodynamic system suitable for thermodynamic temperature analysis, including thermal mass. In FIG. 4, each node has its own heat capacity, $CN_i$ and $CS_j$. The term heat capacity may also be thought of as thermal mass is described above.

In FIG. 4, node $N_i$ has an adjacent arrow with the reference character $P_I$ to represent a node receiving heat. The node $S_j$ is a temperature sensor node, and a third node is indicated $C_L$. As will be appreciated by reference to FIG. 4, there is a thermal resistance extending from each node to ambient air at temperature TA. Also, there is a thermal resistance from each node to the outside world. Similarly, thermal resistance data $\theta S_i S_j$ represents a thermal resistance between sensors $S_i$ and $S_j$. The capacitor indicated by reference $CN_i$ represents an electrical capacitor which is indicative of the thermal mass of node Ni. Also shown in FIG. 4 is the thermal mass of node $C_L$ indicated by reference character $C_{CL}$.

The circuit illustrated in FIG. 4 may be characterized by the use of equations 10, 11 and 12 below:

$$i = \overline{1,m}: P_i(t) + \sum_{\substack{j=1 \\ j \neq i}}^{m} \theta_{NiNj}^{-1}(T_{Nj} - T_{Ni}) + \sum_{j=1}^{k} \theta_{NiSj}^{-1}(T_{Sj} - T_{Ni}) + \qquad (10)$$

$$\sum_{j=1}^{p} \theta_{C_L Ni}^{-1}(T_{CL} - T_{Ni}) + \theta_{NiA}^{-1}(T_A - T_{Ni}) - C_{Ni}\frac{dT_{Ni}}{dt} = 0$$

$$i = \overline{1,k}: \sum_{j=1}^{m} \theta_{NiSj}^{-1}(T_{Nj} - T_{Si}) + \sum_{\substack{j=1 \\ j \neq i}}^{k} \theta_{SiSj}^{-1}(T_{Sj} - T_{Si}) + \qquad (11)$$

$$\sum_{j=1}^{p} \theta_{CjSi}^{-1}(T_{Cj} - T_{NiSi}) + \theta_{SiA}^{-1}(T_A - T_{Si}) - C_{Si}\frac{dT_{Si}}{dt} = 0$$

$$i = \overline{1,p}: \sum_{j=1}^{m} \theta_{NiCj}^{-1}(T_{Nj} - T_{Ci}) + \qquad (12)$$

$$\sum_{j=1}^{k} \theta_{SjCi}^{-1}(T_{Sj} - T_{Ci}) + \sum_{\substack{j=1 \\ j \neq i}}^{p} \theta_{CiCj}^{-1}(T_{Cj} - T_{Ci}) - C_{Ci}\frac{dT_{Ci}}{dt} = 0$$

In the above notation, "m" represents the number of power (heat) sources, "k" represents the number of temperature sensors, and "p" represents the number of heat capacity nodes.

Equation (10) represents the law of energy conservation applied to the power dissipating nodes $N_i$, where the equation is similar to equation (8) with the following differences: $P_i(t)$ is a function of time, the fourth group of terms is the interaction with the $C_L$ type of thermal masses, and the last term represents the contribution due to the self thermal mass $CN_i$. Similarly, equation (11) is similar to equation (9) but has the extra third group of terms denoting the interactions with the $C_i$ thermal masses and the last term related to the thermal mass of the element. Equation (12) is similar to equation (11) but is used for the thermal masses $C_L$ instead of the sensors Sj.

The total number of equations of the form (10, 11, 12) is m+k+p, the total number of unknowns is m+p+1 (unknown temperatures at Ni, $C_L$ and TA). If no error is affecting the temperatures read from sensors $S_j$, there is a need for only one sensor (k=1). However, in reality the temperatures are affected by errors. Also, the system may have regions that are less tightly coupled, so measuring the temperature at more than one point may be needed. More than one sensor may also be needed when some thermal resistance values are not known.

Figure 5:
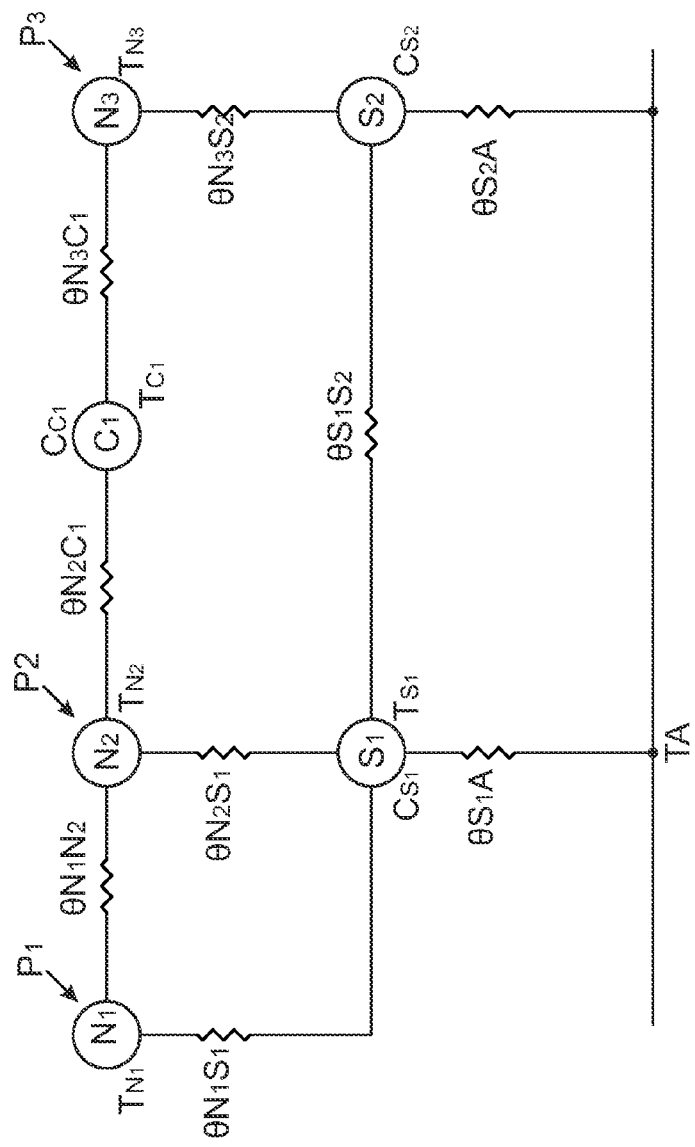
FIG. 5 is a thermal circuit representing a particular thermodynamic system that includes three power dissipating nodes, two temperature sensors and thermal mass for the components.

FIG. 5 is a thermal circuit representing an exemplary thermodynamic system 500 which includes a CPU, indicated as node $N_1$, a memory indicated as node $N_2$ and a disk drive indicated as node $N_3$. In system 500, it is assumed that the CPU at $N_1$ is located relatively close to the memory node $N_2$, and that disk drive ($N_3$) is located at some distance from the processor and the memory. In view of the relative distances, certain assumptions are made and are explained below. For thermal management in the system 500, temperature sensors, indicated by $S_1$ and $S_2$ are positioned on the circuit board at some proximity to the nodes $N_1$, $N_2$ and $N_3$. As earlier described, thermal resistances between elements of the system are illustrated using the Greek letter θ with subscripts, and the power into the nodes is indicated by P with a subscript indicative of the respective node.

Additionally, thermal sensor heat capacity is indicated by $CS_1$ for sensor $S_1$ and $CS_2$ for sensor $S_2$. Similarly $C_{C1}$ indicates the heat capacity of the disk drive ($N_3$) with respect to the circuit board upon which the disk drive is mounted. As before, resistors are utilized to indicate thermal resistances between nodes, sensor elements, and heat masses. For example, the resistor indicated $\theta N_1 S_1$ indicates the thermal resistance between node $N_1$ and temperature sensor $S_1$. Similarly, the thermal resistance between sensor $S_1$ and sensor $S_2$ is indicated by resistor $\theta S_1 S_2$. A thermal resistance between node $N_2$ and thermal mass $C_1$ is indicated by $\theta N_2 C_1$. The thermal resistance between node $N_3$ and thermal mass $C_1$, is indicated by reference character $\theta N_3 C_1$.

Figure 6:
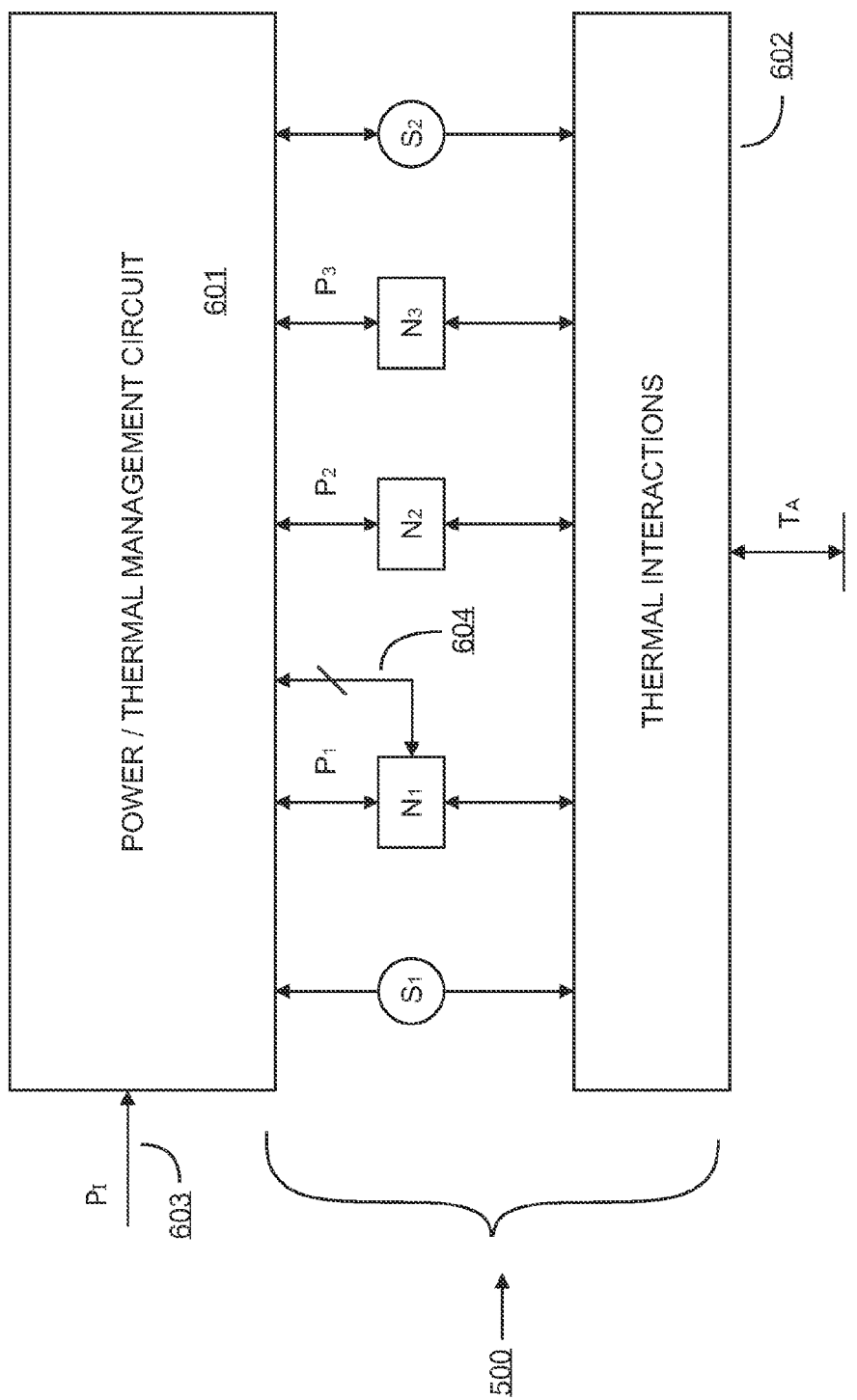
FIG. 6 is a block diagram representation of the system 500 shown in FIG. 5.

FIG. 6 is a block diagram representation of the system 500 represented in FIG. 5 and further includes Power/Thermal Management Circuit (PTMC) 601 which is coupled to nodes $N_1$, $N_2$, and $N_3$. PTMC 601 receives input Power PI over input lead 603 and provides power $P_1$, $P_2$ and $P_3$ to nodes $N_1$, $N_2$, and $N_3$, respectively. For convenience of explanation, the thermal interactions among the elements in circuit 500 are lumped within block 602 of FIG. 6. Bus 604 is used to communicate data between PTMC 601 and the CPU. The CPU sends commands to PTMC 601 to control the power/thermal regime and the PTMC 601 sends thermal measurements, limit values, power data, and estimated, measured, or predicted values for temperatures to the CPU. Data communicated between the PTMC 601 and CPU include heat capacity, temperature, and thermal resistance. The following set of equations may be used to characterize the dynamic operation of system 500:

$$P_1(t) + \theta_{N1N2}^{-1}(T_{N2} - T_{N1}) + \theta_{N1S1}^{-1}(T_{S1} - T_{N1}) - C_{N1}\frac{dT_{N1}}{dt} = 0 \qquad (13)$$

$$P_2(t) + \theta_{N1N2}^{-1}(T_{N1} - T_{N2}) + \qquad (14)$$
$$\theta_{N2S1}^{-1}(T_{S1} - T_{N2}) + \theta_{N2C1}^{-1}(T_{C1-C2}) - C_{N2}\frac{dT_{N2}}{dt} = 0$$

$$P_3(t) + \theta_{N3S2}^{-1}(T_{S2} - T_{N3}) + \theta_{N3C1}(T_{C1} - T_{N3}) - C_{N3}\frac{dT_{N3}}{dt} = 0 \qquad (15)$$

$$\theta_{N1S1}^{-1}(T_{N1} - T_{S1}) + \theta_{N2S1}^{-1}(T_{N2} - T_{S1}) + \qquad (16)$$
$$\theta_{S1S2}^{-1}(T_{S2} - T_{S1}) + \theta_{S_1 A}^{-1}(T_A - T_{S1}) - C_{S1}\frac{dT_{S1}}{dt} = 0$$

-continued $$\theta_{N3S2}^{-1}(T_{N3} - T_{S2}) + \theta_{S1S2}^{-1}(T_{S1} - T_{S2}) + \theta_{S2A}^{-1}(T_A - T_{S2}) - C_{S2}\frac{dT_{S2}}{dt} = 0 \quad (17)$$

$$\theta_{N2C1}^{-1}(T_{N2} - T_{C1}) + \theta_{N3C1}^{-1}(T_{N3} - T_{C1}) - C_{C1}\frac{dT_{C1}}{dt} = 0 \quad (18)$$

Equation 13 defines thermal relationships with regard to node $N_1$, Equation 14 describes node $N_2$, and Equation 15 describes node $N_3$. Equation 16 describes thermal relationships for sensor $S_1$ and Equation 17 similarly deals with the relationship of sensor $S_2$, all with regard to the remaining parts of system 500. Finally, Equation 18 addresses the heat capacity $C_1$.

The following is a discussion of the three cases encountered in solving the set of equations described above:

a) The same number of unknowns as equations, for example, unknowns are $TN_1$, $TN_2$, $TN_3$, $TC_1$, $\theta S_1 A$ and TA. $\theta S_1 A$ may be unknown if, for example, heat conduction is variable due to variable air flow. In this case the system of equations can be solved as shown.

b) More unknowns than equations: in this case equations are added based on the physics of the system, for instance unknowns are $TN_1$, $TN_2$, $TN_3$, $TC_1$, $\theta S_1 A$, $\theta S_2 A$ and TA. In this case one should derive another equation. If, for instance, the two thermal resistances are similar in nature (e.g., depend on the same air flow) than the ratio of the two thermal resistances can be determined to be a constant.

c) More equations than unknowns: For example if $\theta S_1 A$ and $\theta S_2 A$ are known, the system is over-constrained. Solving equations 1 through 6 will provide non-zero results, referred to for convenience here as $\epsilon 1, \epsilon 2, \epsilon 3, \epsilon 4, \epsilon 5$ and $\epsilon 6$. The above system of equations may be solved in the least mean square technique sense; minimizing $$\varepsilon_1^2 + \varepsilon_2^2 + \varepsilon_3^2 + \varepsilon_4^2 + \varepsilon_5^2 + \varepsilon_6^2$$

minimizes error. The above six equations are utilized to determine the temperature at each of the nodes, the temperature being a function of the power being consumed by the element at the node as well as heat which the node is receiving from adjacent nodes.

The operation of PTMC 601 is as follows. PTMC 601 measures, estimates or calculates the power injected into each of the nodes N1, N2 and N3 at a measurement time t, measures the temperature $TS_1$ and $TS_2$, then solves the sets of equations based on the thermal information and other data provided or known to the system designer. The solution provides the temperature at the locations of interest. By measuring in successive steps, increasing or decreasing temperature changes will be identified and that information used to determine for example, the time before heat in an element may become excessive. This is described in more detail below with regard to description of the operation which is provided in connection with FIGS. 7A and 7B. The prediction data is then sent to a system controller which utilizes the data to determine the appropriate actions, if any, to be taken regarding the operation of the system.

In some embodiments, the system controller is a finite state machine (FSM) used to optimize the goals of the system based on the predicted values for temperature. The system controller can function to maximize the performance of the system within the temperature limits of the components, as well as taking the proactive steps illustrated in the flow chart of FIGS. 7A and 7B.

The foregoing steps of solving the set of equations for the temperature T at the various locations, as well as providing prediction data to a system controller, may instead of being performed by the PTMC be performed by an operating system associated with the system which includes the operating devices $N_1$, $N_2$ and $N_3$.

Figure 7A:
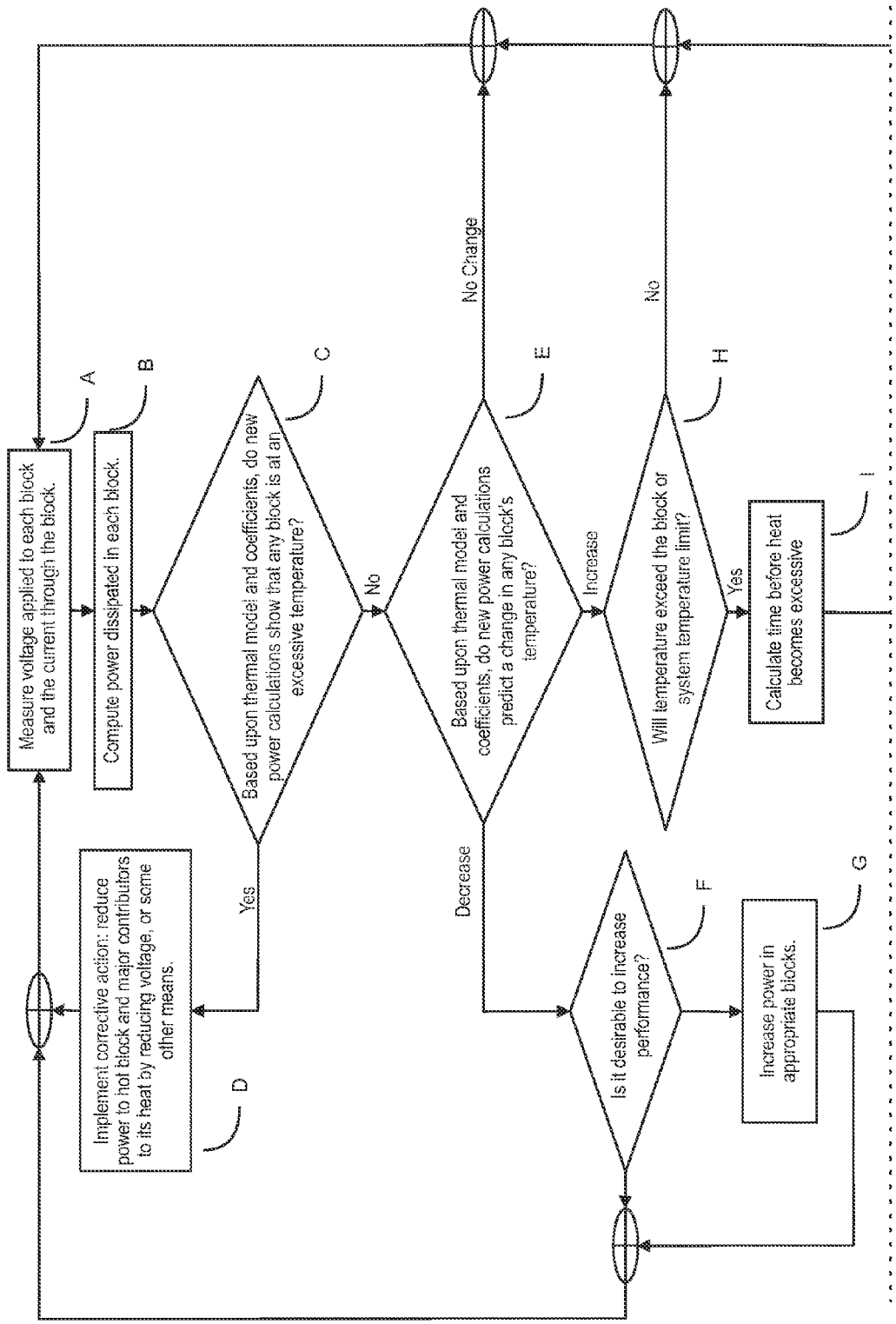
FIGS. 7A and 7B combined provide flow chart illustrating the operation of one embodiment of the present invention.
Figure 7B:
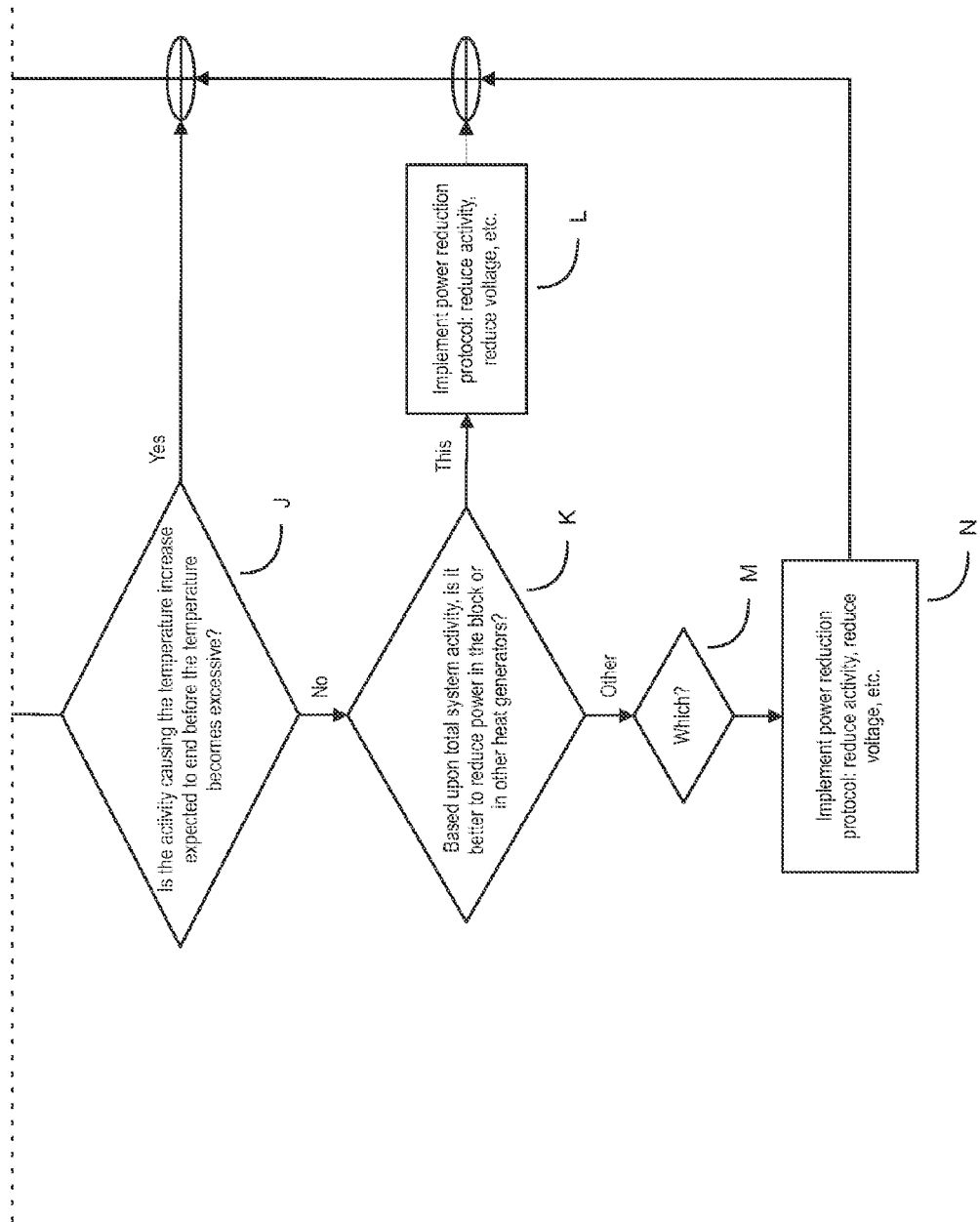

FIGS. 7A and 7B combined provide flow chart illustrating the operation of one embodiment of the present invention. Referring to FIG. 7A, in step A, the voltage applied to each of the blocks of the system and the current through the block is measured. Then in step B, the power dissipated by each of the blocks is computed and in step C, based on the thermal model and coefficients, a determination is made whether the latest calculations show that any block is at an excessive temperature. If the temperature is determined to be excessive, then corrective action is taken in step D. This action, depending on the system configuration in other blocks, may be to reduce the power to the block which is at excessive temperature and also to reduce the power to other blocks which contribute heat to the block which is at an excessive temperature. The reduction in the heat contribution could be achieved in a number of ways, such as reducing the activity level of the block or reducing the voltage. After step D the process returns to step A.

If step C determines that there are no blocks which have reached an excessive temperature, then the new calculation results are examined in Step E to see if a change is predicted in any block's temperature. If the result of this examination is that there would be no change, then the process returns to step A and continues reviewing each of the blocks. However, if there is a decrease in the temperature of any blocks, then it may be possible to increase the performance of the system by providing more power to the block. Step F determines if increasing performance is desirable. If the answer is yes, step G is performed to increase power to appropriate blocks. If it is not desirable to increase performance, then the system returns to the step A. If it is determined in Step E that the new power calculations predict an increase in the temperature of any block, then the temperature is tested against block and system temperature limits in step H. If no limit will be exceeded then the system returns to step A. If a temperature is predicted to exceed a limit in step H, then the time until the limit is exceeded is calculated in step I and processing continues at step J.

Referring to FIG. 7B in step J, the duration of the activity causing a temperature limit to be exceeded is tested against the time estimate for exceeding the temperature limit calculated in step I. If the activity will terminate before the estimated time for temperature to exceed the limit, processing returns to step A. If the activity will not terminate before the temperature limit is exceeded, processing continues with step K.

In step K, a decision is made based on total system activity whether it is better to reduce the power which is being provided to the block likely to overheat or reduce the power to other heat generators. If a decision is made that the block which is likely to exceed permissible temperature is the one to which power should be reduced, then in step L power reduction is implemented. This will be achieved by reducing the activity of the block or if permissible reducing the voltage to the block. After power reduction in step L, processing returns to step A. If a determination is made in step K that power should be reduced in another block, then in step M a determination is made as to which block's power should be reduced. After a block is selected for power reduction in step M, a power reduction protocol is implemented in step N to reduce the activity of the selected block or reduce the voltage provided to the block. Following actions in step N, the system returns to the starting point in step A and resumes checking the system.

Figure 8:
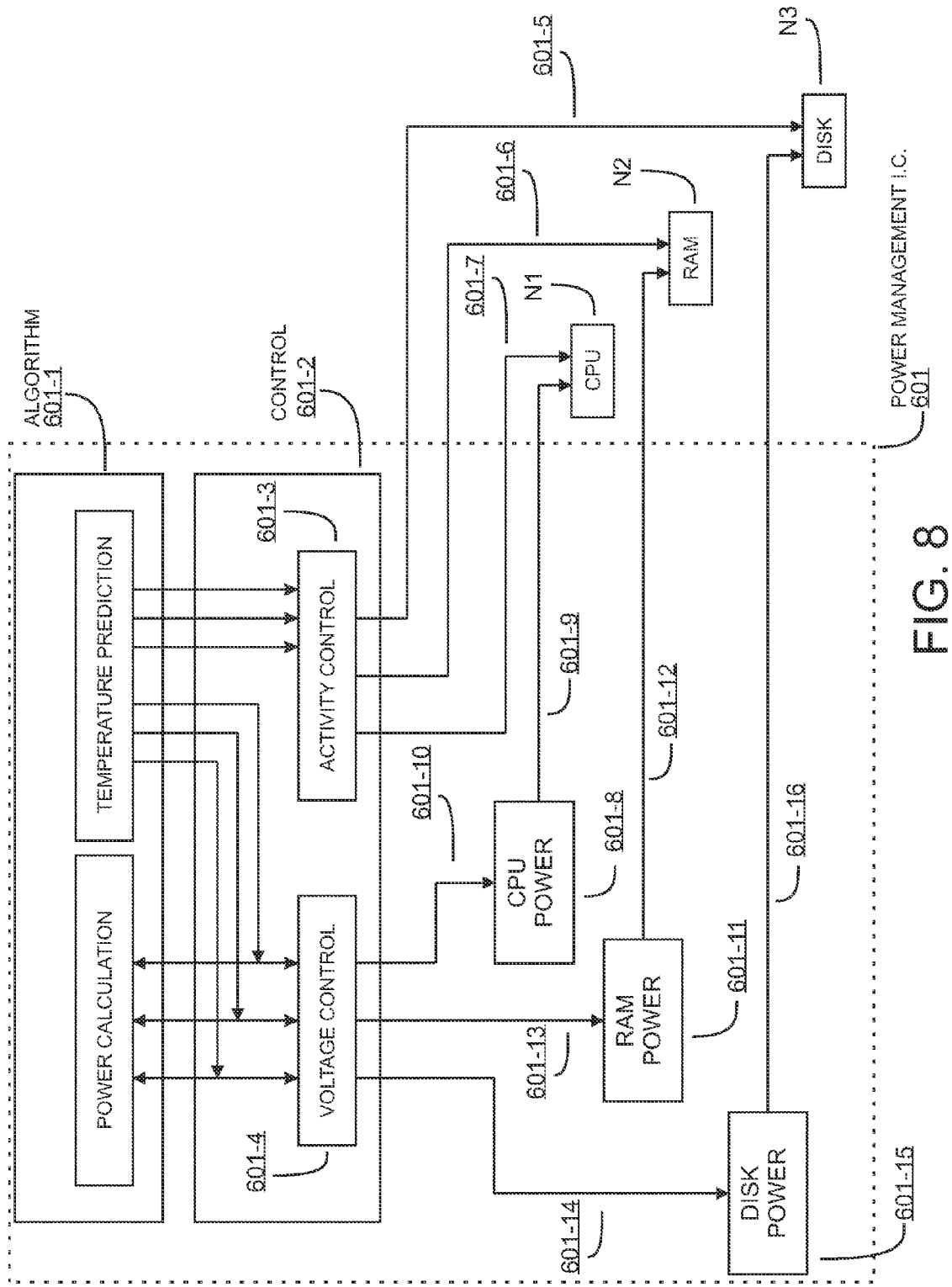
FIG. 8 is a functional block diagram of an embodiment of PTMC 601 illustrated in FIG. 6.

FIG. 8 is a functional block diagram of an embodiment of the PTMC 601 illustrated in FIG. 6. Functionally, the actions within PTMC 601 may be generally divided into the algorithm function indicated as 601-1, and the control section function indicated as 601-2. The results of the computations performed in the algorithm portion 601-1 may, based upon the algorithm used, result in a decision to change an activity, indicated by activity control block 601-3, or to change a voltage being provided to the controlled items (CPU, RAM and DISK) in block 601-4. If activity control is desired, then a signal is provided over line 601-5 for controlling the DISK or 601-6 for controlling the RAM, or 601-7 for controlling the activities of CPU. The control signal may affect one or more of the devices under control, depending on the system designer's choice. Alternatively, the selected algorithm in block 601-1 may specify a change in voltage being provided to the CPU, RAM, or DISK, or a combination of activity and voltage change. As reflected in FIG. 8, voltage control to the CPU is provided via CPU power block 601-8 which provides power to the CPU over line 601-9. CPU power block 601-8 receives the control signal from voltage control block 601-4 via line 601-10. Similarly, a decision on changing the power to a RAM may be achieved using RAM power block 601-11 which provides power to the RAM via 601-12, with the RAM power block 601-11 receiving a control signal over 601-13. Finally, if it is desirable to change the power to the disk drive (N3), power voltage control block 601-4 transmits the signal over lead 601-14 to DISK power control block 601-15, the output of which over lead 601-16 provides an operating voltage to DISK.

It will of course be appreciated that PTMC 601 may be functionally achieved in various other manners and the representation in FIG. 8 is merely one embodiment which may be used in practicing the present invention.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

We claim:

1. A method for determining the temperature of any of a plurality of electrical components, wherein the electrical components dissipate substantially all of their received power in the form of heat, the method comprising:
   (a) monitoring a power source wherein the power source provides power to each of the electrical components independently, obtaining a power parameter value for each of the electrical components therefrom;
   (b) calculating the power dissipated by each of the electronic components;
   (c) calculating a temperature parameter value for each of the electrical components, using a thermal model and predetermined coefficients comprising the steps of:
      calculating a self-heating parameter value;
      subtracting a parameter value representing heat loss; and
      adding a parameter value representing the net heat transfer between the certain one electrical component and each of the remaining electrical components; and
   (d) calculating an instant temperature of each electrical component by combining the calculated temperature parameter value of said electrical component to a previously stored temperature value of said electrical component.

2. The method according to claim 1, wherein the previously stored temperature value is obtained by monitoring a one or more temperature sensor.

3. The method according to claim 1, further comprising communicating temperature parameter data to a host.

4. A method for controlling the temperature of any of a plurality of electrical components, wherein the electrical components dissipate substantially all of their received power in the form of heat, the method comprising:
   (a) monitoring a power source wherein the power source provides power to each of the electrical components independently, obtaining a power parameter value for each of the electrical components therefrom;
   (b) calculating the power dissipated by each of the electronic components;
   (c) calculating a temperature parameter value for each of the electrical components, using a thermal model and predetermined coefficients comprising the steps of:
      calculating a self-heating parameter value;
      subtracting a parameter value representing heat loss; and
      adding a parameter value representing the net heat transfer between the certain one electrical component and each of the remaining electrical components;
   (d) calculating an instant temperature of each electrical component by combining the calculated temperature parameter value of said electrical component to a previously stored temperature value of said electrical component;
   (e) comparing the instant temperature of each electrical component to a corresponding predetermined value; and
   (f) reducing the power dissipation of any one or more of the electrical components wherein the calculated temperature exceeds a predetermined value by a step selected from the group of actions consisting of:
reducing the voltage applied to the electrical component,
reducing the clocking frequency of the electrical component,
reducing the performance of the electrical component, and
controlling a cooling means.

5. The method according to claim 4, further comprising communicating temperature parameter data to a host.

6. The method according to claim 4, wherein reducing the power dissipation of a first electrical component comprises reducing the power dissipation of a second electrical component, thereby reducing the net heat transport to the first electrical component from the second electrical component.

7. The method according to claim 4, wherein at least one of said electrical components includes a microprocessor for executing one or more programs.

8. The method according to claim 7, wherein reducing the power dissipation of an electrical component comprises selecting one or more programs to be suspended for execution by the microprocessor according to a rule.

9. The method according to claim 8, wherein the rule comprises selecting a program to be suspended wherein said program is a lower priority than any other instant program being executed by the microprocessor.

10. The method according to claim 7, wherein reducing the power dissipation of an electrical component comprises selecting one or more programs for a reduction in the time available for execution of the program by the microprocessor according to a rule.

11. The method according to claim 10, wherein the rule comprises selecting a program for a reduction in the time available for execution of the program by the microprocessor wherein said program is a lower priority than any other instant program being executed by the microprocessor.

12. The method according to claim 4, wherein the previously stored temperature value is obtained by monitoring a one or more temperature sensor.

13. A method for controlling the temperature of any of a plurality of electrical components, wherein the electrical components dissipate substantially all of their received power in the form of heat, the method comprising:
(a) monitoring a power source wherein the power source provides power to each of the electrical components independently, obtaining a power parameter value for each of the electrical components therefrom;
(b) calculating the power dissipated by each of the electronic components;
(c) calculating a temperature parameter value for each of the electrical components, using a thermal model and predetermined coefficients comprising the steps of:
calculating a self-heating parameter value;
subtracting a parameter value representing heat loss; and
adding a parameter value representing the net heat transfer between the certain one electrical component and each of the remaining electrical components;
(d) calculating a future temperature for each electrical component by combining the calculated temperature parameter value of said electrical component to a previously stored temperature value of said electrical component, wherein the previously stored temperature value is obtained by monitoring a temperature sensor;
(e) comparing the future temperature of each electrical component to a corresponding predetermined value; and
(f) according to a rule, modifying the power dissipation of any one or more of the electrical components by a step selected from the group of actions consisting of:
reducing the voltage applied to the electrical component,
reducing the clocking frequency of the electrical component,
reducing the performance of the electrical component, and
controlling a cooling means.

14. The method according to claim 13, further comprising communicating temperature parameter data to a host.

15. The method according to claim 13, wherein reducing the power dissipation of a first electrical component comprises reducing the power dissipation of a second electrical component, thereby reducing the net heat transport to the first electrical component from the second electrical component.

16. The method according to claim 13, wherein at least one of said electrical components includes a microprocessor for executing one or more programs.

17. The method according to claim 16, wherein reducing the power dissipation of an electrical component comprises selecting one or more programs to be suspended for execution by the microprocessor according to a rule.

18. The method according to claim 17, wherein the rule comprises selecting a program to be suspended wherein said program is a lower priority than any other instant program being executed by the microprocessor.

19. The method according to claim 16, wherein reducing the power dissipation of an electrical component comprises selecting one or more programs for a reduction in the time available for execution of the program by the microprocessor according to a rule.

20. The method according to claim 19, wherein the rule comprises selecting a program for a reduction in the time available for execution of the program by the microprocessor wherein said program is a lower priority than any other instant program being executed by the microprocessor.

21. The method according to claim 13, wherein the rule comprises reducing the power dissipation of an electronic component if an activity calculated to cause an increase in the future temperature of the electronic component will persist to a time after the time when the future temperature of the electronic component will exceed the predetermined value.

22. The method according to claim 13, wherein the rule comprises increasing the power dissipation of an electronic component if the future temperature of the electronic component is calculated to be less than the predetermined value.

23. The method according to claim 13, wherein the rule comprises increasing the power dissipation of an electronic component if the future temperature of the electronic component is calculated to decrease.

* * * * *